April 30, 1968   P. WOLFENSBERGER   3,380,768
PROFILE RAIL AND CORNER CONNECTING PIECE
Filed Oct. 29, 1965   3 Sheets-Sheet 1

INVENTOR
Paul Wolfensberger
BY
His Attorney

April 30, 1968    P. WOLFENSBERGER    3,380,768
PROFILE RAIL AND CORNER CONNECTING PIECE
Filed Oct. 29, 1965    3 Sheets-Sheet 3

INVENTOR
Paul Wolfensberger
BY
His Attorney

United States Patent Office 3,380,768
Patented Apr. 30, 1968

3,380,768
PROFILE RAIL AND CORNER
CONNECTING PIECE
Paul Wolfensberger, Eckwiesenstrasse 5,
Winterthur, Switzerland
Filed Oct. 29, 1965, Ser. No. 505,664
Claims priority, application Switzerland, Nov. 2, 1964,
14,146/64; Feb. 10, 1965, 1,785/65; Mar. 2, 1965,
2,871/65
17 Claims. (Cl. 287—189.36)

ABSTRACT OF THE DISCLOSURE

A profile rail and corner connecting piece for making structural units such as frameworks and scaffolds, the profile rail incorporating a body member provided with two grooves extending in the lengthwise direction of the body member and narrowing towards the outside, the body member including a diagonally extending web portion to each side of which is disposed one of the grooves. A pair of neighboring inner side portions are incorporated within the body member, each side portion being provided with at least one opening communicating with an associated groove. The corner connecting piece is provided with a plurality of connecting elements, each connecting element being disposed substantially perpendicularly to one another and being detachably engageable with at least one of the grooves within the profile rail. Thus, a plurality of profile rails may be intercoupled together in a detachable yet positively secured manner.

---

The present invention has reference to an improved section or profile rail and a corner connecting piece for the production of structural units, such as frameworks and scaffolds or the like.

Previously, for the manufacture of work tables, shelves, closeable cabinets or closets, mounting frames for switchboards and control panels, and other similar structures, there were primarily employed angle irons which were sawed off at the desired location of the miter and then welded or threaded. What is unsatisfactory in such technique is carrying out the connections at the corners. Welding is an operation which can usually only be performed by a skilled laborer and limits the application of the commonly used light metals which oftentimes cannot be replaced by other materials. In the event that the corners are to be threaded, then additional stabilisation plates are necessary in order to prevent displacement or turning of the connection. What is also unsatisfactory is the necessity of having to threadably connect possible wall facings or doors. Finally, frameworks which have been produced in this manner can only again be dismantled when required with considerable labor and loss of material.

For such reasons it has been proposed to employ prefabricated section or profile rails and the therewith associated corner connecting pieces in lieu of the previously mentioned angle irons. Such a corner connecting piece incorporates for instance three connecting elements which are disposed perpendicular to one another if the ends of the profile rail provided with a miter or bevel cut can be lowered in the rails to be connected, so that the connecting piece is no longer visible from the outside. In so doing, the connecting elements each possess two pairs of surfaces which can slide along corresponding surfaces of the profile rail, and means are provided for moving the pairs of surfaces relative to one another, whereby they are pressed against the corresponding pairs of surfaces of the profile rail. For each connecting element there exists between profile rail and corner connecting piece two sets of contact surfaces which are diagonally disposed towards one another, each of which consists of two surfaces which are at right-angles to one another, so that the connecting elements possess a rectangular cross-section.

An essential disadvantage of this construction resides in the submerged corner connecting piece and the diagonal oppositely situated groups of contact surfaces. In frames for cabinets and scaffolds where the corner connecting piece intercouples three profile rails a very complicated bevel cut is necessary which requires special aids and dexterity during the working operation, this thus limiting the possibilities of use of such corner connecting piece.

There has also been disclosed another profile rail with associated corner connecting piece which is particularly suitable for the construction of housings with compact wall paneling or facing. Here the framework is assembled from metal pipes or tubes interconnected by corner connecting pieces consisting of three perpendicularly interconnected pipe sockets or nipples. Each pipe is previously inserted in the central bore of a profile ledge formed from an elastomer and after the pipes have been connected to one another by means of the connecting elements the latter are inserted in the corner pieces likewise manufactured from an elastomer, and for which purpose it is necessary to form a slot in one corner piece. In order to produce a compact housing the lateral surfaces of the grooves receiving the connections are pressed onto the paneling by pressing in reinforcement bands in special recesses which are arranged adjacent these grooves. The range of application of such profile rails and the associated corner connecting pieces is very limited and, for instance, they cannot be used for the production of a work table or mounting frame.

Now, it is an important object of the present invention to provide new and improved structural members of the mentioned type which do not possess the previously explained disadvantages of prior art constructions.

A further important object of the present invention has reference to a new and improved construction of profile rail and corner connecting piece which is relatively simple and robust in construction, economical to manufacture, easy to assemble and disassemble, and capable of wide application.

Generally speaking, the invention is characterized by the features that the profile rail is provided in its lengthwise direction with two grooves which narrow towards the outside, each of which is situated to one side of a cross-sectional diagonal and both of the neighboring inner side portions of the profile rail are open. Moreover, between the corner connecting piece and the profile rail there are provided three connecting elements which are disposed perpendicular to one another and which are capable of engaging in a groove of an associated profile rail.

The inventive profile rail with the therewith associated corner connecting piece possesses a whole series of advantages with respect to the previously mentioned known structures. The asymmetrical connecting elements projecting out of the corner connecting piece can only be assembled in one direction together with the corner connecting piece, which thus prevents false assembly or subsequent aligning of the connecting elements. The slots of the profile rail and corner connecting piece which are recessed or stepped in width permit the use of wall facing of different thicknesses, and at these slots which are flexed at their base, bands which are to be inserted, for instance hinge elements or bands, are retained so well that they can no longer be pulled out laterally, also not by the shear movement produced by the weight of a door. In the grooves opening towards the inside of the framework, it is possible to attach inserts to which there can be applied shelves or other partitions for the inner compartment surrounded by the framework. Finally, the profile rail, in particular when formed of two parts, is very easy and extremely economical to manufacture in extrusion molding processes. The connecting element or arm between the corner connecting piece and the profile rail and accordingly also the guide groove for receiving such arm possess a trapezoidal-like cross-sectional configuration and only one, specifically a flat contact surface is pressed against a screw of the connecting arm during attachment by means of this screw which is bearing against the floor or base of the associated guide groove.

Other features, objects and advantages of the invention will become apparent by reference to the following detailed description and drawings in which.

Figure 1:
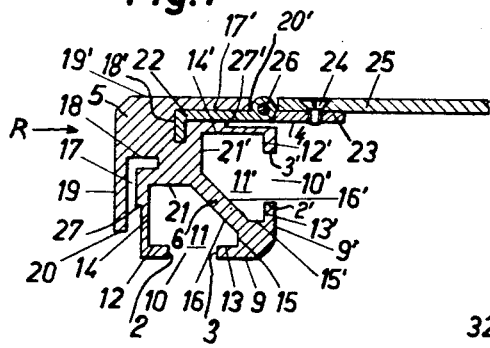
FIGURE 1 is a cross-sectional view of a first embodiment of inventive profile rail with inserted door hinge.

Describing now the drawings, it will be recognized that the section or profile rail R depicted in cross-section in FIGURE 1 incorporates a body member 5 possessing a quadratic basic form. Two neighboring sides of the body member 5, which hereinafter will be conveniently referred to as the inner side portions 9 and 9' respectively, at approximately their middle region possess a respective opening 10 and 10', each of which is laterally bounded by two sides 2, 3 and 2', 3' respectively, extending at substantially right-angles to the associated inner side portion 9 and 9' respectively. These openings 10 and 10' each communicate with a larger groove 11 and 11' respectively, the one respective side of which bounding the associated opening 10 and 10' consists of two wall portions 12, 13 and 12', 13' respectively, which extend parallel to the inner side portions 9 and 9' respectively. The further groove sides 14, 15 and 14', 15' are disposed at right-angles to these wall portions 12, 13 and 12', 13' respectively. While the groove sides 14 and 14' extend linearly the full depth of the grooves 11 and 11' respectively, the sides 15 and 15' are connected to the sides 21 and 21' respectively, forming the floor or base of the relevant groove 11, 11' and also extend parallel to the inner side portions 9 and 9' respectively, by means of the obliquely extending sides 16 and 16' respectively. These sides 16, 16' are parallel to the diagonal of the quadratic form and provide a diagonally extending, longitudinal web portion 6.

Adjacent each of these guide grooves 11 and 11' there is arranged a respective further, deeper slot 17 and 17' which extends parallel to its neighboring external side portion 19 and 19' of the quadratic basic form. Each such slot 17, 17' is open at one end and flexed or bent at right-angles at its base or closed end 18, 18' respectively. The forward position of the small surface 20 and 20' remaining between the respective slot 17 and 17' and the bordering external side 19 and 19' respectively, is shorter than would correspond to the quadratic basic form.

FIGURE 1 further depicts a hinge unit 4, one flap 22 of which is inserted in the recess or slot 17' and its angled base portion 18', whereas at the other flap 23 there is secured a metal plate or sheet 25 by means of a screw 24 or any other equivalent fastening expedient. The hinge joint 26 fits into the space obtained by shortening the small surface 20' so that, when the hinge flap 23 is pivoted through about 90°, it forms an extension of the one inner side portion 9' without projecting in a disturbing manner.

Figure 2:
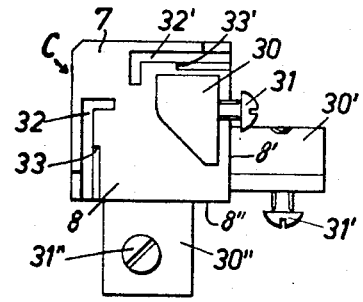
FIGURE 2 is a front view of the corner connecting piece.

The corner connecting piece C depicted in FIGURE 2 incorporates a body member 7 which substantially possesses a cubic basic form. The surfaces of the cube are practically the same size as the cross-section of the profile rail R. A respective connecting element or arm 30, 30' and 30" protrudes from three abutting surfaces 8, 8' and 8" of the body member 7 of the cube, only the upper one 8 of which is fully visible in FIGURE 2. The cross-section of the connecting elements 30, 30' and 30" is constructed such that it fits in positively coupling manner in the guide grooves 11 or 11' of the profile rail R. Since the cross-section of each connecting element is not symmetrical, insertion of one of these connecting elements into the profile rail is only possible in a specific position, thus eliminating every possible inadvertent and improper assembly.

Each of the connecting elements 30, 30' and 30" possesses a threaded bore extending transverse to its lengthwise direction and into each of which there is threadably connected a screw 31, 31' and 31" respectively. After insertion of one of the connecting elements 30, 30' or 30" in a guide groove 11 or 11' of the profile rail R, the associated screw 31, 31' or 31" projects through the opening 10 or 10' (FIGURE 1), and as soon as it is tightened presses against the sides 21 or 21', in other words against the floor or base of the corresponding guide groove, so that there is achieved a rigid clamp connection between corner connecting piece C and profile rail R. The three abutting surfaces 8, 8' and 8" of the corner connecting piece C, each of which carries a connecting element 30, 30' and 30" respectively, as aforedescribed, are further provided with flexed or angled slots 32 and 32' the position of which is such that after assembling the corner connecting piece C with the profile rail R, they can be considered to be extensions of the slots 17 and 17' respectively provided with the flexed portions 18 and 18' respectively.

The slots 17 and 17' in the profile rail R and the slots 32 and 32' in the corner connecting piece C are provided for the purpose of accommodating the cover plates or sheets. The thickness of these sheets may be different depending upon requirements and load. In order to provide the possibility of introducing sheets of different thickness into these slots they narrow in stepwise manner from their open end towards their base or rear. Thus, in FIGURE 1 there can be clearly recognized the recessed or stepped portions 27 and 27' of the slots 17 and 17' respectively, and in FIGURE 2 there is depicted the recessed or stepped portions 33 and 33' of the slots 32 and 32' respectively. The widening of such slots as previously described, is here shown to be provided at the side of the relevant slot furthest away from the neighboring external side portion of the profile rail and the corner connecting piece, as the case may be, whereby there is achieved the result that, as viewed from the outside, the cover plate or sheet together with the forward edge 20 or 20' always snugly closes the profile rail.

Naturally, in place of only one such widening of the slots 17 and 17' and 32 and 32' respectively, it is possible, if required, to provide a plurality of the previously considered stepped or recessed portions so that, as viewed in cross-section, the side of the slot facing away from the neighboring groove 11 or 11' has imparted to it a stepped profile which narrows in a direction towards the base of the relevant slot.

Figure 3:
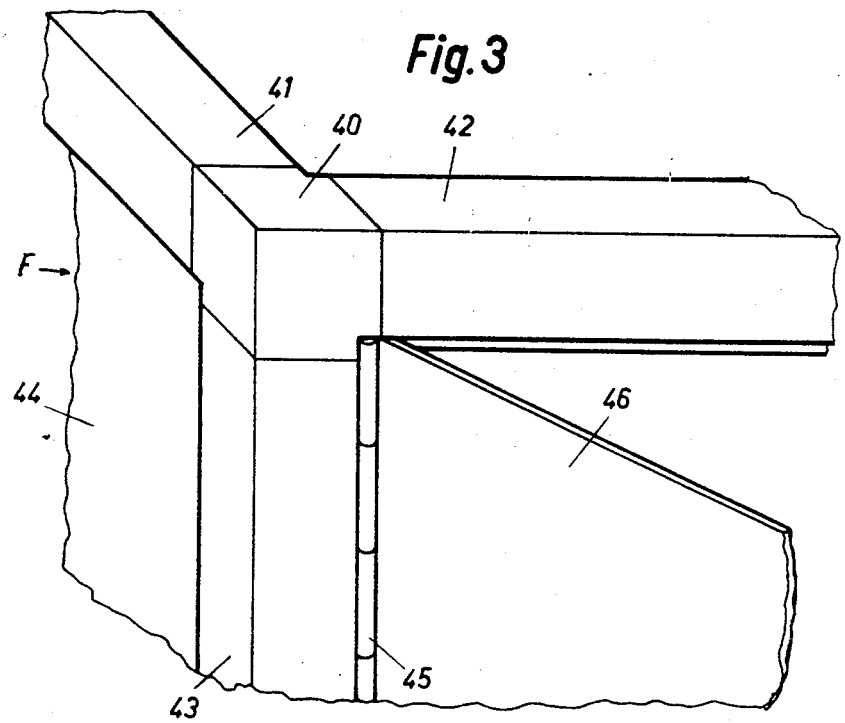
FIGURE 3 is a perspective view of a corner of a framework formed by means of the inventive profile rails and corner connecting piece, showing at the left a wall facing or paneling and at the right a hingedly connected door.
Figure 4:
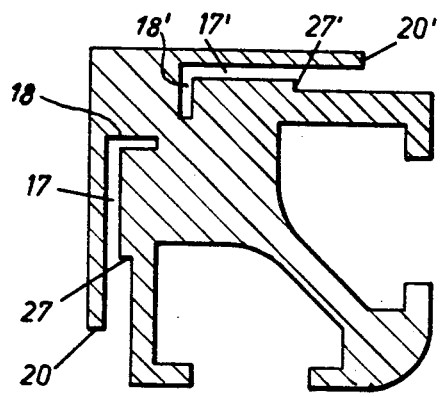
FIGURE 4 is an enlarged sectional view of the profile rail designed according to the invention and incorporating stepped or recessed slots.
Figure 5:
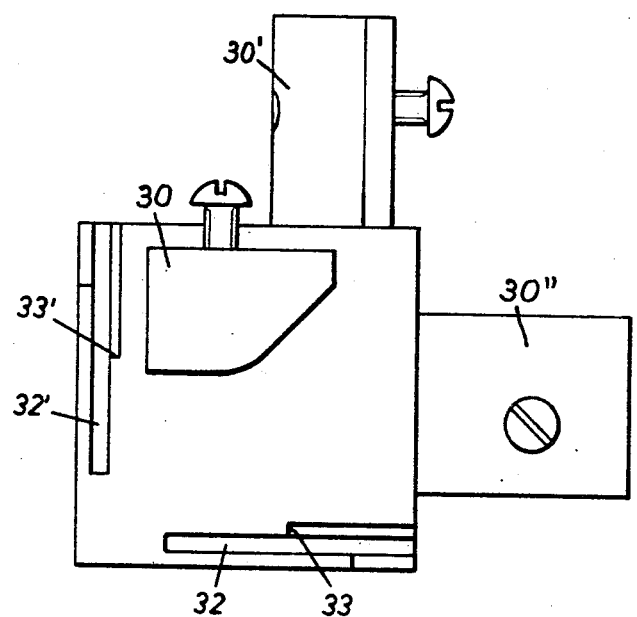
FIGURE 5 is an enlarged front view of the corner connecting piece provided with recessed or stepped slots.

In FIGURE 3 there is schematically illustrated, in perspective view, a corner of a framework F consisting of the corner connecting piece 40, the three profile rails 41, 42 and 43, the cover sheet or plate 44, a hinge 45 and the door 46. The profile rails are as described previously, assembled together with the previously considered connecting elements 30, 30', 30'' of the corner connecting piece and are detachably held together by means of screw pressure.

The cover plate 44 is guided in the slots, corresponding to slots 17 and 17' respectively of FIGURE 1, of the profile rails 41 and 43. The hinge unit 45 is secured in the profile rail 43 in the manner previously considered in conjunction with the hinge unit 26 of FIGURE 1 and by means of a simple flexure or bending of a flap of this hinge unit there is obtained a positive and secure attachment thereof without any special fastening elements. The shortening of the forward side of the one external side of the profile rail 42—corresponding to the shortening of the surface 20 of FIGURE 2—provides an impact surface for the door 46 and submerges the closed door 46 to the same extent in the framework F formed by the profile rails 41, 42 and 43 and corner connecting piece 40 as the cover sheet or plate 43 is sunk.

The previously discussed profile rail R is advantageously formed of one piece with relatively thick walls and solid material. However, it is also possible, while maintaining the previously developed advantages, to manufacture the profile rail considerably simpler, cheaper and with less weight.

Figure 6:
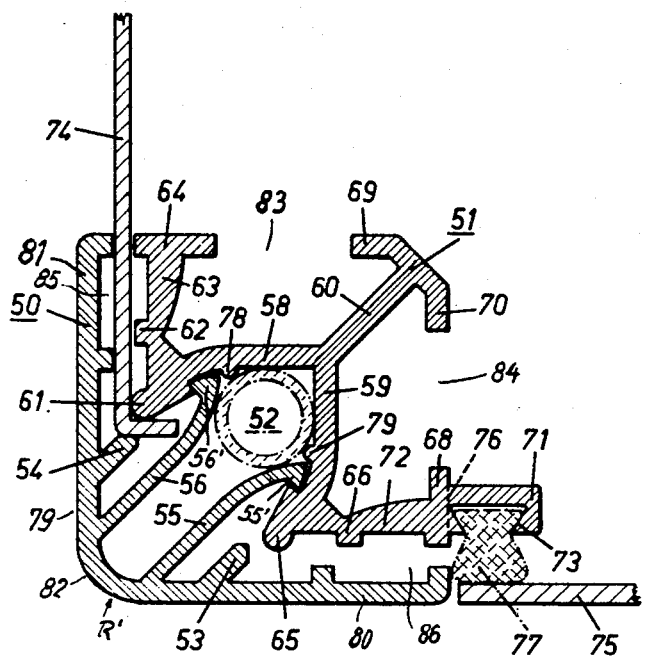
FIGURE 6 is a cross-sectional view of a profile rail formed of two elements or parts and provided with an additional guide groove for a sealing material and a rod member which increases rigidity or strength.

Thus, by specifically referring to the profile rail R' depicted in FIGURE 6 it will be recognized that such is composed of for instance an extrusion-molded outer or external rail element 50, an inner rail element 51 and a tube or pipe 52. When viewed in cross-section, the external rail element 50 comprises a profile angle 79 possessing the form of a right-angle, and at the inner surface of each of its legs 80 and 81 it is provided adjacent the point of joinder or apex 82 with an impact member 53 and 54 respectively, and a resilient leg member 55 and 56 respectively. Also, the inner rail element 51, when viewed in cross-section, possesses three legs 58, 59, 60, two legs 58 and 59 of which are disposed at substantially right-angles to one another while the third leg 60 bisects the remaining 270° angle. Both of the legs 58 and 59, at approximately the middle of the confronting surfaces, carry a respective rib member 78 and 79, and at each external end a respective transverse portion 63 and 72 extending at approximately right-angles. Each transverse portion 63 and 72 carries a series of lengthwise ribs 61, 62, 64 and 65, 66, 68 respectively. The third leg 60 carries at its outermost end two flaps or lips 69 and 70 which together enclose a right-angle. The transverse portion 72 belonging to the leg 59 exhibits an extension or protruding portion 71 in which there is worked a dovetail guide 73 for a sealing member 77.

During assembly of this type profile rail R' the outer rail element 50 and the inner rail element 51 are pushed into one another in their lengthwise directions such that both resilient or spring legs 55 and 56 come to bear against the ribs 79 and 78 respectively, and the thickened leg ends 55' and 56' come to rest behind the lengthwise ribs 65 and 61 respectively. The dimensions are selected such that the mutual arrangement of the elements depicted in FIGURE 6 forms a stable rail structure. As additional fixation of the position of the resilient legs 55, 56 for particularly strongly loaded profile rails R' there is advantageously provided the pipe or tube element 52 which prevents a flexing or springing-out of the resilient legs 55 and 56.

Both of the guide grooves or slots 83 and 84 for the introduction of the corner connecting piece C are disposed between the three legs 58, 59 and 60, both of the transverse portions 59, 63 and both ribs or flaps 69, 70. Thick cover sheets or plates 74 are guided in the slots 85 or 86 formed between the inner surfaces of the outer rail element 50 and the lengthwise ribs 61, 62 and 65, 66 respectively. Thin cover sheets extend up to the impact surfaces and members 53 and 54. With a hinge unit, the flap or band of which is secured in the profile rail and is flexed or bent at its end, the flexed portion is guided between the impact members 53 or 54, the resilient legs 55 or 56 respectively, and the projecting or bulbous portion 65 or 61 respectively. A profiled rubber strip or band 77 is here shown inserted in the dovetail grooves 73 of the protruding portion 71 which provides for movable cover sheets or plates, for instance a door 75, a dust-proof seal or covering.

A shoulder or extension corresponding to the protruding portion 71 could also be provided at the other transverse portion 63, or the protruding portion 71 can be dispensed with when no sealing is required, so that the transverse portion 72 terminates at the location indicated with the broken line 76.

In order to prevent springing-back of the resilient leg members 55 and 56 it is also possible to employ in lieu of the pipe or round rod 52 a rod with a different cross-sectional configuration.

Assembly of the profile rail R' can also take place such that the inner rail element 51 and the outer rail element 50 are placed against one another and by application of pressure (in the plane of the illustrated cross-section) the resilient legs 56, 55 snap into the space between the lengthwise ribs 61, 65, and the ribs 78, 79, respectively.

A complete carrier or support frame embodies eight corner connections of the type shown in FIGURE 3. However, it is also possible to produce two-dimensional frameworks in that only two of the three connecting elements of the corner connecting pieces are attached to profile rails.

Although in the described embodiment the corner connecting pieces with their connecting elements are constructed, by way of example, of one piece, such could also be detachably connected to one another. Moreover, the corner connecting pieces and the profile rails are preferably formed of light metal or alloy and/or of plastic.

For particular applications it is also possible to construct the corner connecting piece such that its form corresponds to two assembled corner connecting pieces of the type depicted in FIGURE 2. Of the six connecting elements of such a combined corner connecting piece, two respective pairs extend in the same direction whereas both of the remaining connecting elements successively extend or depend in opposite directions.

The profile rail and the corner connecting piece can, for instance, be used for the manufacture of mounting frames for switchboards, closeable cabinets, shelving, work tables, and like structural units.

While there is shown and described present preferred embodiments of the invention, it is to be distinctly understood that the invention is not limited thereto but may be otherwise variously embodied and practised within the scope of the following claims.

What is claimed is:

1. A profile rail and corner connecting piece for making structural units, such as frameworks and scaffolds, said profile rail incorporating a body member provided with two grooves extending in the lengthwise direction of said body member and narrowing towards the outside, said body member including a diagonally extending web portion to each side of which there is disposed one of said grooves, said body member incorporating a pair of neighboring inner side portions each provided with at least one opening communicating with an associated groove, said body member further incorporating a pair of neighboring external side portions and being provided with two slots, each slot being disposed at substantially right angles to each other and extending in the lengthwise direction of said body member substantially parallel to an external side portion, said corner connecting piece incorporating a body member having three connecting elements disposed substantially perpendicular to one another and each detachably and non-rotatably engageable with at least one of said grooves.

2. A profile rail and corner connecting piece for making structural units, such as frameworks and scaffolds, said profile rail incorporating a body member provided with two groves extending in the lengthwise direction of said body member and narrowing towards the outside, said body member including a diagonally extending web portion to each side of which there is disposed one of said grooves, said body member incorporating a pair of neighboring inner side portions each provided with at least one opening communicating with an associated groove, said corner connecting piece incorporating a body member having three connecting elements disposed substantially perpendicular to one another and each detachably engageable with at least one of said grooves, and wherein each groove incorporates a pair of surfaces laterally disposed with regard to the respective opening of the associated inner side portion, each said pair of surfaces extending substantially parallel to one another and perpendicular to said associated inner side portion into which said associated groove opens.

3. A profile rail and corner connecting piece as defined in claim 2, wherein said body member of said profile rail is provided with a respective slot having one open end and an oppositely situated angled base portion which is disposed between each groove and a neighboring external side portion of said body member of said profile rail.

4. A profile rail and corner connecting piece as defined in claim 1, wherein each connecting element is provided with a screw member, each screw member having a free end capable of bearing against the base of the associated groove into which the connecting element is inserted during assembly of said corner connecting piece with the profile rail, to thereby provide a clamping connection therebetween.

5. A profile rail and corner connecting piece as defined in claim 3, wherein said body member of said corner connecting piece incorporates three slots each having an open end and capable of receiving a cover plate, each of said slots opening into two surfaces of said body member of said corner connecting piece and constructed to form an extension of an associated slot provided at said body member of said profile rail.

6. A profile rail and corner connecting piece as defined in claim 5, wherein both said body members are formed of a light metal.

7. A profile rail and corner connecting piece as defined in claim 5, wherein at least one of said body members is formed of a light metal.

8. A profile rail and corner connecting piece as defined in claim 5, wherein at least one of said body members is formed of plastic.

9. A profile rail and corner connecting piece as defined in claim 5, wherein said slots of said profile rail and said corner connecting piece are each provided with at least one stepped portion and the largest width of each such stepped slot is located adjacent the open marginal region thereof.

10. A profile rail and corner connecting piece as defined in claim 9, wherein the stepped portion of said slots of said profile rail is provided at the side of each slot most remote from the associated neighboring external side portion of the profile rail.

11. A profile rail and corner connecting piece as defined in claim 9, wherein the stepped portion of said slots of said corner connecting piece is provided at the side of each slot most remote from the associated neighboring external side of the corner connecting piece.

12. A profile rail and corner connecting piece as defined in claim 9, wherein each slot is only provided with a single stepped portion.

13. A profile rail and corner connecting piece as defined in claim 5, wherein said profile rail is formed of two rail elements which interengage with one another.

14. A profile rail and corner connecting piece as defined in claim 13, wherein one of said two rail elements forms an external rail element and the other an internal rail element, said internal rail element including a pair of transverse portions each of which is provided with a lengthwise extending rib, said external rail element being constructed as a profile angle having a pair of angle legs disposed at approximately 90° with respect to one another, said external rail element including a respective resilient leg member extending substantially diagonally from the inner surface of each of said angle legs adjacent the region of the point of joinder of said pair of angle legs, the free end of each of said resilient leg members engaging behind one of said lengthwise ribs of said transverse portions of said internal rail element.

15. A profile rail and corner connecting piece as defined in claim 14, further including means disposed between said resilient leg members and said internal rail element for preventing springing-back of said resilient leg members.

16. A profile rail and corner connecting piece as defined in claim 13, wherein said two rail elements define an external rail element and an internal rail element, said internal rail element including a protruding portion which extends past said external rail element, said protruding portion being provided with a groove for the receipt of a sealing element.

17. A profile rail and corner connecting piece for the production of structural units, said profile rail incorporating a body member having four side portions defining a pair of neighboring inner side portions and a pair of neighboring external side portions, said body member being provided with two grooves extending in the lengthwise direction of said body member and narrowing towards said external side portions, said body member further including a diagonally extending web portion to each side of which there is disposed one of said grooves, each of said grooves being located near one external side portion and its neighboring inner side portion, each of said neighboring inner side portions being provided with at least one opening communicating with the associated groove, said body member being further provided with two slots, each slot being disposed at substantially right angles to each other and extending in the lengthwise direction of said body member substantially parallel to an external side portion, said corner connecting piece being provided with a plurality of connecting elements disposed substantially perpendicular to one another and each detachably engageable with at least one of said grooves.

References Cited
UNITED STATES PATENTS

| | | | |
|---|---|---|---|
| 2,001,943 | 5/1935 | Steeple | 52—282 X |
| 2,213,402 | 9/1940 | Lowry | 52—282 |
| 2,765,886 | 10/1956 | Tedaldi et al. | 312—140 X |
| 2,932,369 | 4/1960 | Huguenin | 287—189.36 |
| 3,160,245 | 12/1964 | Parlecka | 287—189.36 |

CARL W. TOMLIN, *Primary Examiner.*

W. L. SHEDD, *Assistant Examiner.*